US011507832B2

(12) United States Patent
Saito et al.

(10) Patent No.: US 11,507,832 B2
(45) Date of Patent: Nov. 22, 2022

(54) CALIBRATING RELIABILITY OF MULTI-LABEL CLASSIFICATION NEURAL NETWORKS

(71) Applicant: SAP SE, Walldorf (DE)

(72) Inventors: Sean Saito, Singapore (SG); Auguste Byiringiro, Singapore (SG)

(73) Assignee: SAP SE, Walldorf (DE)

( * ) Notice: Subject to any disclaimer, the term of this patent is extended or adjusted under 35 U.S.C. 154(b) by 408 days.

(21) Appl. No.: 16/813,957

(22) Filed: Mar. 10, 2020

(65) Prior Publication Data

US 2021/0287081 A1 Sep. 16, 2021

(51) Int. Cl.
*G06N 20/00* (2019.01)
*G06N 3/08* (2006.01)
*G06K 9/62* (2022.01)
*G06N 3/04* (2006.01)

(52) U.S. Cl.
CPC .............. *G06N 3/08* (2013.01); *G06K 9/6267* (2013.01); *G06N 3/0481* (2013.01); *G06N 20/00* (2019.01)

(58) Field of Classification Search
CPC .......... G06N 20/00; G06N 3/08; G06N 20/20; G06N 7/005; G06N 3/0481; G06K 9/6267
See application file for complete search history.

(56) References Cited

U.S. PATENT DOCUMENTS

2016/0189210 A1\* 6/2016 Lacey .................... G06N 7/005 705/7.31
2017/0286805 A1 10/2017 Yu et al.

OTHER PUBLICATIONS

Z. Liu and S. Wang, "Broken Corn Detection Based on an Adjusted YOLO With Focal Loss," in IEEE Access, vol. 7, p. 68281-68289, 2019, doi: 10.1109/ACCESS.2019.2916842. (Year: 2019).\*
Tran, Giang Son, et al. "Improving accuracy of lung nodule classification using deep learning with focal loss." Journal of healthcare engineering 2019 (2019). (Year: 2019).\*
P. Yun, L. Tai, Y. Wang, C. Liu and M. Liu, "Focal Loss in 3D Object Detection," in IEEE Robotics and Automation Letters, vol. 4, No. 2, pp. 1263-1270, Apr. 2019, doi: 10.1109/LRA.2019.2894858. (Year: 2019).\*
U.S. Appl. No. 16/813,948, Saito et al.
Fei-Fei et al., "One-shot learning of object categories." IEEE transactions on pattern analysis and machine intelligence, 28.4, Apr. 2006, 18 pages.
Guo et al., "On calibration of modern neural networks." Proceedings of the 34th International Conference on Machine Learning—vol. 70. JMLR. org, Aug. 6, 2017, 14 pages.
Janocha et al., "On loss functions for deep neural networks in classification." arXiv preprint arXiv:1702.05659, Feb. 18, 2017, 10 pages.
Lin et al., "Focal loss for dense object detection" Proceedings of the IEEE international conference on computer vision, 2017, 10 pages.

(Continued)

*Primary Examiner* — Li Liu
(74) *Attorney, Agent, or Firm* — Fish & Richardson P.C.

(57) ABSTRACT

Methods, systems, and computer-readable storage media for tuning behavior of a machine learning (ML) model by providing an alternative loss function used during training of a ML model, the alternative loss function enhancing reliability of the ML model, calibrating the confidence of the ML model after training, and reducing risk in downstream tasks by providing a mapping between the confidence of the ML model to the expected accuracy of the ML model.

20 Claims, 5 Drawing Sheets

(56) References Cited

OTHER PUBLICATIONS

Parikh et al., "A decomposable attention model for natural language inference." arXiv preprint arXiv:1606.01933, Jun. 6, 2016, 7 pages.
Extended European Search Report issued in European Application No. 20214072.9 dated Jun. 9, 2021, 10 pages.
Johnson et al., "Deep learning and thresholding with class-imbalanced big data." 18th IEEE International Conference on Machine Learning and Applications (ICMLA), Dec. 2019, 8 pages.
Mukhoti et al., "The Intriguing Effects of Focal Loss on the Calibration of Deep Neural Networks." 2019, 16 pages.

* cited by examiner

CALIBRATING RELIABILITY OF MULTI-LABEL CLASSIFICATION NEURAL NETWORKS

BACKGROUND

In general, machine learning includes training a machine learning (ML) model that receives input and provides some output. Machine learning can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

In use, a ML model outputs a confidence score with a prediction. The confidence score indicates the confidence in the accuracy of the prediction made by the ML model. Higher confidence scores imply higher confidence from the ML model. This interpretation is important not only for users reviewing the ML model, but also for any other algorithms or systems that act upon the output of the ML model. For example, in a downstream task that uses the output of an upstream ML model, a downstream ML model may take the confidences of the upstream ML model into account in performing the downstream task.

In some instances, a ML model can be considered overly confident, if the ML model provides relatively high confidence scores for all predictions it outputs. If the (upstream) ML model is overly confident, confusion can result in downstream systems. Hence it is imperative for a model to output reliable confidence scores associated with its predictions.

SUMMARY

Implementations of the present disclosure are directed to a framework for training of machine learning (ML) models, calibrating confidence of ML models, and reducing of risk in downstream tasks that are based on output of an upstream ML model. More particularly, implementations of the present disclosure provide an alternative loss function used during training of a ML model, the alternative loss function enhancing reliability of the ML model, calibrating the confidence of the ML model after training, and reducing risk in downstream tasks by providing a mapping between the confidence of the ML model to the expected accuracy of the ML model.

In some implementations, actions include training the ML model using a modified focal loss function, the modified focal loss function including an exponential variable having a value that is determined based on a class of training data provided as input to the ML model during a training iteration, after training of the ML model, calibrating a confidence of the ML model by processing the ML model using temperature scaling including fixing parameters of layers of the ML model and re-training of the ML model to optimize the modified focal loss function by adjusting a temperature value during iterations of training, after calibrating the confidence of the ML model, generating a threshold-to-accuracy mapping for the ML model, the threshold-to-accuracy mapping associating a set of threshold values to a set of accuracy values, receiving a selected accuracy value, determining a threshold value from the threshold-to-accuracy mapping based on the selected accuracy value, and during production use of the ML model selectively discarding predictions of the ML model based on the threshold value. Other implementations of this aspect include corresponding systems, apparatus, and computer programs, configured to perform the actions of the methods, encoded on computer storage devices.

These and other implementations can each optionally include one or more of the following features: the modified focal loss function is provided as $$F_{mod} = -\sum_{i}^{m} t_i (1-p_i)^{\gamma_i} \log(p_i)$$

where i is a counter ($1 \le i \le m$), m is a number of classes c in a set of classes C, $t_i$ is an indicator variable for each class c in the set of classes C, $p_i$ is the probability of an input to the ML model being classified as class $c_i$ during training, and $\gamma_i$ is the exponential variable having a value that is determined based on the class $c_i$; the value of the exponential value is determined based on a frequency of a respective class within the training data; temperature scaling further includes replacing at least one layer of the ML model prior to re-training of the ML model; one or more parameters of at least one layer of the ML model are each divided by the temperature value; the threshold-to-accuracy mapping is generated using holdout validation set, the holdout validation set including data that is not used in either training of the ML model or confidence calibration of the ML model; and the ML model includes a multi-layer neural network.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
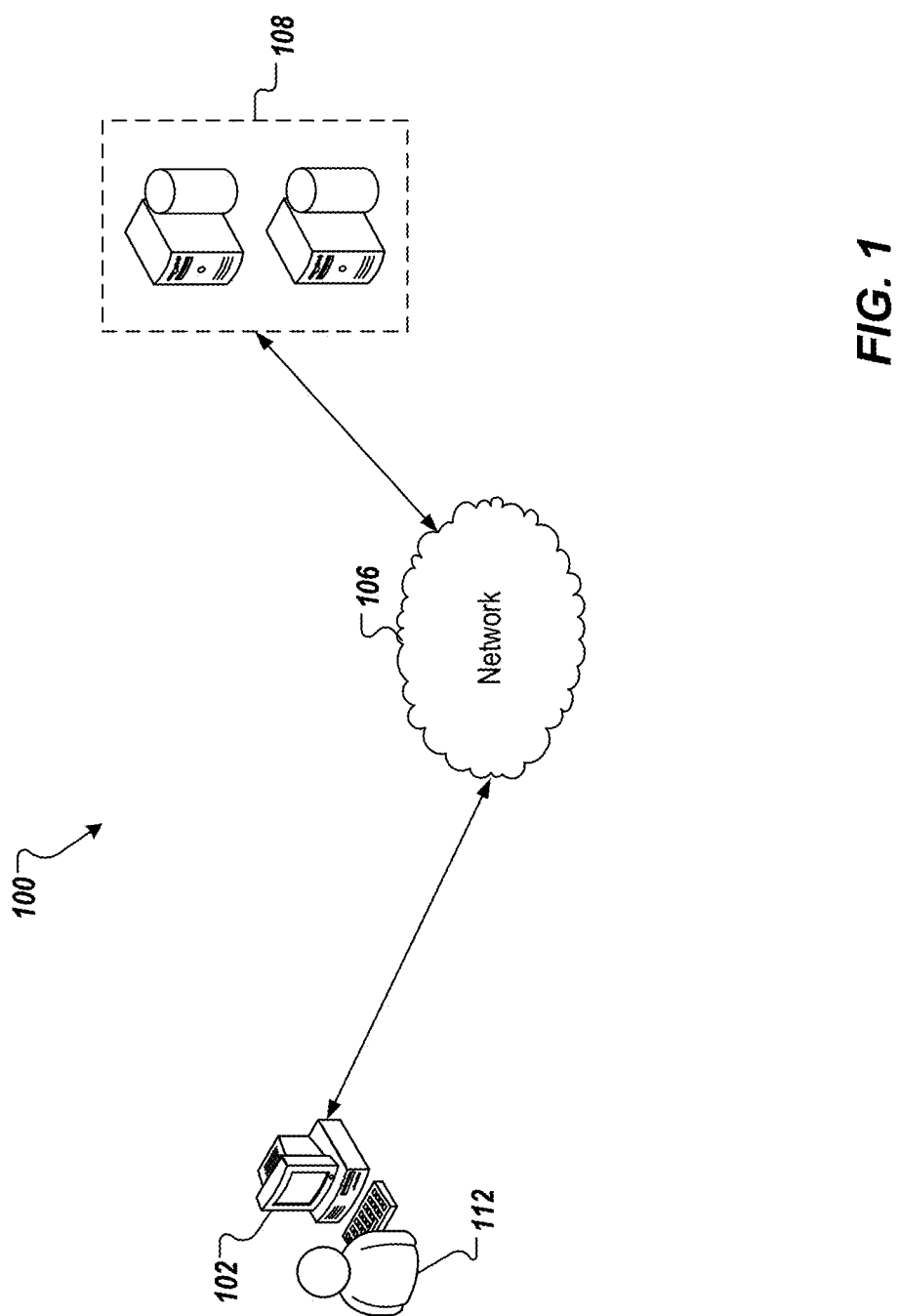
FIG. 1 depicts an example architecture that can be used to execute implementations of the present disclosure.

Implementations of the present disclosure are directed to a framework for training of machine learning (ML) models, calibrating confidence of ML models, and reducing risk in downstream tasks that are based on output of an upstream ML model. More particularly, implementations of the present disclosure provide an alternative loss function used during training of a ML model, the alternative loss function enhancing reliability of the ML model, calibrating the confidence of the ML model after training, and reducing risk in downstream tasks by providing a mapping between the confidence of the ML model to the expected accuracy of the ML model.

Implementations can include actions of training the ML model using a modified focal loss function, the modified focal loss function including an exponential variable having a value that is determined based on a class of training data provided as input to the ML model during a training iteration, after training of the ML model, calibrating a confidence of the ML model by processing the ML model using temperature scaling including fixing parameters of layers of the ML model and re-training of the ML model to optimize the modified focal loss function by adjusting a temperature value during iterations of training, after calibrating the confidence of the ML model, generating a threshold-to-accuracy mapping for the ML model, the threshold-to-accuracy mapping associating a set of threshold values to a set of accuracy values, receiving a selected accuracy value, determining a threshold value from the threshold-to-accuracy mapping based on the selected accuracy value, and during production use of the ML model selectively discarding predictions of the ML model based on the threshold value.

Implementations of the present disclosure are described in further detail with reference to an example problem space that includes the domain of finance and matching bank statements to customer accounts. More particularly, implementations of the present disclosure are described with reference to the problem of, given a bank statement (e.g., a computer-readable electronic document recording data representative of the bank statement), determining one or more customer accounts that are represented in the bank statement. It is contemplated, however, that implementations of the present disclosure can be realized in any appropriate problem space.

To provide further context for implementations of the present disclosure, and as introduced above, machine learning can be used in a variety of problem spaces. An example problem space includes autonomous systems that use ML models to match items of one entity to items of another entity. Examples include, without limitation, matching questions to answers, people to products, bank statements to invoices, and bank statements to customer accounts.

Numerous ML problems deal with learning patterns and insights from data. Typically, the goal of a ML model is to enable autonomous systems to execute tasks and improve efficiencies of processes. For example, and in the example domain of finance, autonomous systems can use ML models to match a bank statement to a set of invoices that are present in the financial system and reconcile automatically. Another use case is to identify an entity (e.g., a customer) that another entity (e.g., a particular bank statement) belongs to. This information is not provided by default. In the example domain of finance, this information can be required to identify, which invoices potentially belong to a particular bank statement. The problem statement for this use case can be described as: given an entity (e.g., bank statement), find the set of entities (e.g., customers) that it belongs to. In these use cases, the term bank statement refers to a financial transaction (e.g., a payment (a check, a wire transfer) received for an invoice).

For such a use case, a ML model can output a confidence score (e.g., having a value from 0 to 1) with a prediction (e.g., a bank statement and customer account match). The confidence score indicates the probability that that the prediction is correct. This is also referred to as the confidence level of the ML model. Higher confidence scores imply higher confidence from the ML model. This interpretation is important not only for users reviewing the ML model, but also for any other algorithms or systems that act upon the output of the ML model. For example, in a downstream task where bank statements are matched to invoices and accounting documents, a downstream ML model may take the confidences of an upstream ML model (e.g., the ML model that matched bank statements to customers) and filter a set of invoices based on customer membership. In some instances, a ML model can be considered overly confident, if the ML model provides relatively high confidence scores for all predictions it outputs. If the (upstream) ML model is overly confident, confusion can result in downstream systems. Hence it is imperative for a model to output reliable confidence scores associated with its predictions.

In view of the above context, implementations of the present disclosure provide a framework for training of ML models, calibrating confidence of ML models, and reducing risk in downstream tasks that are based on output of an upstream ML model. More particularly, and as described in further detail herein, implementations of the present disclosure provide an alternative loss function (referred to herein as a modified focal ($F_{mod}$) loss function) used during training of a ML model, the $F_{mod}$ loss function enhancing reliability of the ML model. Implementations of the present disclosure also provide for calibrating the confidence of the ML model after training. Also, implementations of the present disclosure enable reduction of risk in downstream tasks by providing a mapping between the confidence of the ML model to the expected accuracy of the ML model.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an autonomous system that uses a ML model to match entities. That is, the server system 104 can receive computer-readable electronic documents (e.g., bank statements), and can match electronic documents (e.g., a bank statement) to entities (e.g., customers represented in data stored in a customer database). In some examples, the server system 104 can host a ML framework for provisioning ML models. For example, and as described in further detail herein, the ML framework trains ML models, calibrates confidence of ML models, and enables reduction of risk in downstream tasks that are based on output of an upstream ML model.

In some implementations, the ML model is provided as a neural network that includes a plurality of layers. In a non-limiting example, an example ML model includes an embedding layer, a bidirectional long short-term memory (LSTM) layer, a self-attention layer, a dense layer, and an activation layer. In some examples, the embedding layer receives input to the ML model and compresses the input feature space into a smaller feature space. For example, the embedding layer converts the input to the ML model to a representation of the input. In some examples, the bidirectional LSTM layer encodes the output of the embedding layer in two directions (e.g., left-right, forward-backward) to provide respective encodings, which are concatenated and provided as input to the self-attention layer. In some examples, the self-attention layer processes the input received from the bidirectional LSTM layer to identify one or more portions of the input that may be more relevant in performing the task (e.g., matching, labeling, classifying) and provides a vector as output to the dense layer. In some examples, the dense layer changes the dimensions of the vector received from the self-attention layer (e.g., by applying rotation, scaling, translation) and provides a vector as output to the activation layer. In some examples, the activation layer includes an activation function (e.g., softmax function, sigmoid function) that processes the vector received from the dense layer to provide the output of the ML model (e.g., a probability distribution of classes).

In the ML model, each layer includes a respective set of parameters (also referred to as weights) that affect the output of the respective layers. During training of the ML model, values of the parameters across the layers are iteratively changed in an effort to optimize a loss function. In general, ML models are iteratively trained, where, at each iteration, a loss value is determined based on a loss function. The loss value represents a degree of accuracy of the output of the ML model. In general, the loss value can be described as a representation of a degree of difference (or distance) between the output of the ML model and an expected output of the ML model, the expected output being provided from validation data (e.g., data that includes expected outputs for known inputs). In some examples, if the loss value does not meet an expected value (e.g., 0), parameters of the ML model are adjusted, and another iteration of training is performed. In some instances, this process is repeated until the loss value meets the expected value.

As introduced above, implementations of the present disclosure provide the $F_{mod}$ loss function for use during training of a ML model, the $F_{mod}$ loss function enhancing reliability of the ML model. Implementations of the present disclosure also provide for calibrating the confidence of the ML model after training process. Implementations of the present disclosure also enable reduction of risk in downstream tasks by providing a mapping between the confidence of the ML model to the expected accuracy of the ML model.

With regard to training of ML models, during training, a ML model "learns" by minimizing some objective, referred to as a loss function. In general, the loss function measures the distance between a prediction of the ML model and an expected prediction of the ML model (e.g. labels of an image, a set of customers that a bank statement belongs to). Typically, training of ML models uses a cross-entropy (CE) loss function, which is a common way to measure the difference between two probability distributions. The CE loss function can be represented by the following relationship:

$$CE = -\sum_{i=1}^{m} t_i \log(p_i)$$

where i is a counter (e.g., $1 \le i \le m$), m is a number of classes c in a set of classes C (e.g., $C=c_1, \ldots, c_m$), $t_i$ is an indicator variable for each class c in the set of classes C based on the groundtruth (i.e., the expected value to be output by the ML model), and $p_i$ is the probability of some input being classified as class $c_i$. Cross entropy is minimized perfectly (loss of 0) when each prediction is correct (100% test accuracy) and the ML model is perfectly confident (100% probability) for each prediction.

In further detail, t is a binary variable that is 1 when the $i^{th}$ class ($c_i$) is equal to the ground truth class of the input sample, and 0 otherwise. Consequently, the log term in the above relationship is only "activated" when considering the probability of the input sample ($c_i$) being classified as the ground truth class. As a concrete non-limiting example, suppose an image of a dog is to be classified among a set of three classes (e.g., dog, cat, car). When considering the loss of the ML model's prediction on this image, only $\log(p_{i=dog})$ is considered, where as $\log(p_{i=cat})$ and $\log(p_{i=car})$ will be zeroed out by the indicator variable ($t_i$).

However, despite its ubiquity, the CE loss function has certain disadvantages. For example, it is unreasonable to expect a ML model to reach 100% test accuracy, which is particularly true in cases where training data is limited. As another example, the CE loss function encourages the ML model to output high probabilities even when the ML model is likely to be incorrect. In other words, training the ML model using the CE loss function makes the ML model prone to producing highly confident false positives (i.e., the ML model is over-confident).

In view of this, implementations of the present disclosure use the $F_{mod}$ loss function. As described herein, the $F_{mod}$ loss function is similar to the CE loss function in that both compare probability distributions. However, unlike the CE loss function, the $F_{mod}$ loss function of the present disclosure weights correct predictions with high probability lower than predictions with lower probabilities using an exponential constant.

To introduce the $F_{mod}$ loss function of the present disclosure, a focal (F) loss function can be considered. The F loss function is represented by the following relationship:

$$F = -\sum_{i=1}^{m} t_i (1 - p_i)^{\gamma} \log(p_i)$$

where $(1-p_i)^{\gamma}$ refers to an exponential constant and $\gamma$ is a fixed constant. The overall term weighs down the loss value as a whole as $p_i$ becomes closer to 1 (i.e. becomes more highly confident). Using the F loss function, for any value of $\gamma$ greater than 0, the loss values of highly confident predictions becomes smaller. This diminishes the importance of well-classified examples in the training data and induces focus on less-confident classes within the training data without becoming too overconfident about others.

Implementations of the present disclosure modify the F loss function to provide the $F_{mod}$ loss function. More particularly, and in accordance with implementations of the present disclosure a value of $\gamma$ is provided for each class c in the set of classes C. That is, a set of exponent variables $\Gamma$ is provided, where $\Gamma=\gamma_1, \ldots, \gamma_m$, each $\gamma$ being specific to a class c. The $F_{mod}$ loss function of the present disclosure is represented by the following relationship:

$$F_{mod} = -\sum_{i}^{m} t_i (1 - p_i)^{\gamma_i} \log(p_i)$$

In the $F_{mod}$ loss function, the exponent variable $\gamma$ is applied to a component $(1-p_i)$, the value of the exponent variable $\gamma$ being determined based on the class of the training data provided as input to the ML model during a current training iteration. This formulation enables the ML model to be trained to focus on under-represented, under-confident classes, while not becoming over-confident with more represented training samples.

In some implementations, the value of $\gamma$ for a respective class is set based on a level of representation of the class within the training data. For example, if a particular class is less represented in the training data (i.e., there are fewer examples of the class in the training data), a relatively lower value of $\gamma$ is used (as compared to a class that is more represented in the training data). In this manner, the loss for the less represented class is not as penalized during training of the ML model. On the other hand, if a particular class is more represented in the training data (i.e., there are more examples of the class in the training data), a relatively higher value of $\gamma$ is used (as compared to a class that is less represented in the training data). In this manner, the loss for the more represented class is more penalized during training of the ML model.

In some examples, values of $\gamma$ for each class can be empirically determined. In some examples, as an initialization, the label frequency and its ratio with respect to other classes can be used. For example, if the negative class (neg) outweighs the positive class (pos) by a ratio of 2:1, then $\gamma_{neg}=2$, $\gamma_{pos}=1$. Various configurations can then be experimented with (e.g. (2, 1), (4, 2), (1, 0.5), . . . ) and the configuration that produces the optimal test performance can be selected.

Figure 2:
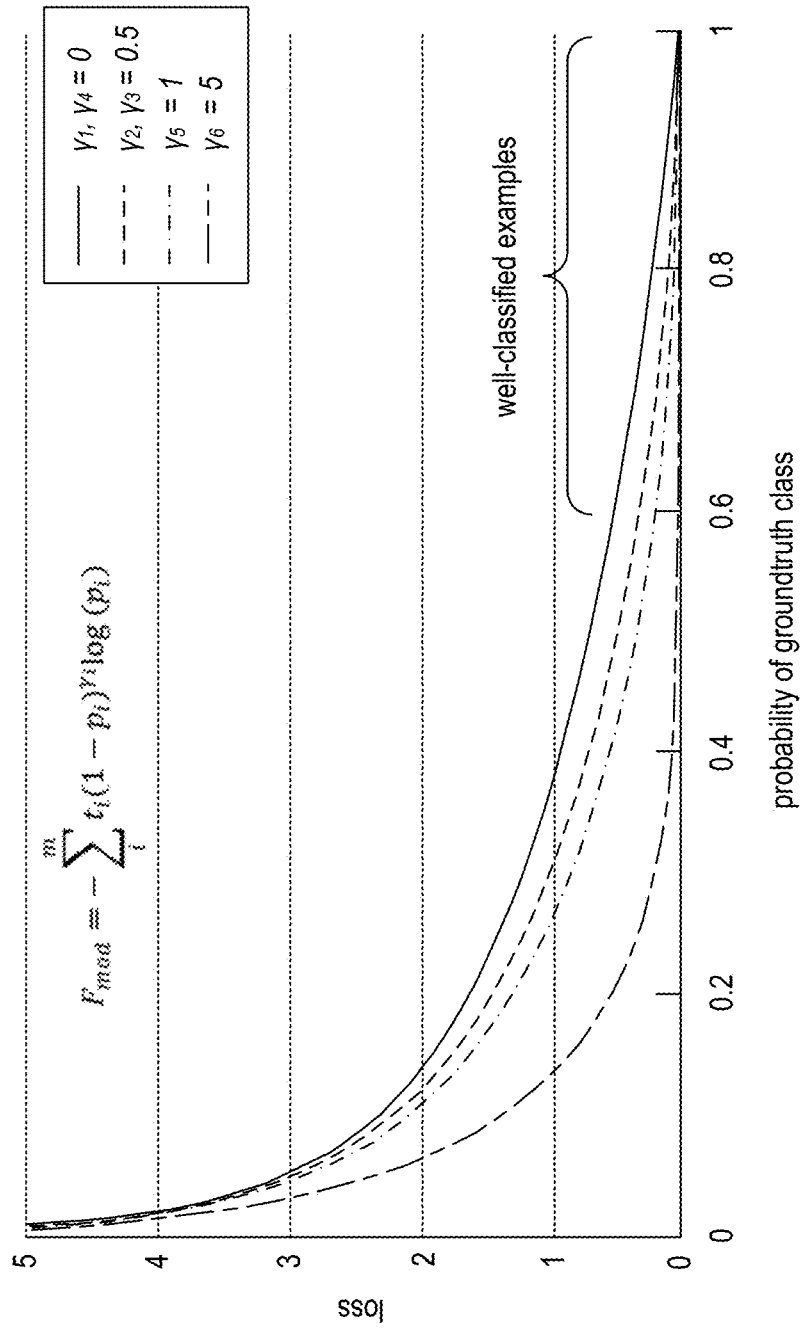
FIG. 2 depicts a graphical representation of a modified focal loss function.

FIG. 2 depicts a graphical representation 200 of a $F_{mod}$ loss function in accordance with implementations of the present disclosure. The example graphical representation 200 includes example curves for a set of classes C that includes classes $c_1$, $c_2$, $c_3$, $c_4$, $c_5$, $c_6$ (i.e., m=6). For each class c, a respective value of $\gamma$ is provided. In some examples, two or more classes can have the same value of $\gamma$. For example, classes having the same, or sufficiently similar, representation within the training data can have the same value of $\gamma$ assigned thereto. In the example of FIG. 2, classes $c_1$, $c_4$ are determined to be the same or sufficiently similar (in terms of representation within the training data) and are assigned the same value of $\gamma$ (e.g., $\gamma_1$, $\gamma_4$=0), and classes $c_2$, $c_3$ are determined to be the same or sufficiently similar (in terms of representation within the training data) and are assigned the same value of $\gamma$ (e.g., $\gamma_2$, $\gamma_3$=0). In the example of FIG. 2, the classes $c_1$, $c_4$ are the least represented classes in the training data, and the class $c_6$ is the most represented class in the training data.

As introduced above, implementations of the present disclosure also provide for calibrating the confidence of the ML model after training. To provide further context, it is commonly known that ML models including a neural network tend to be over-confident in the confidence scores output. That aspect is often under-looked, because the accuracy of the ML model is typically the point of concern. Confidence calibration is about transforming the confidence scores of the ML model, after training, without changing its accuracy. By calibrating the ML model in this manner, the confidence scores the ML model provides are improved (e.g., are more realistic, reliable, and trustworthy than prior to confidence calibration).

Ahead of calibrating confidence of the ML model, the quality of the confidence scores provided by the ML model can be assessed. More particularly, a confidence calibration value can be measured using graphical and/or numerical techniques. In ML, training data is used to train the ML model (e.g., neural network) and validation data is used to evaluate the ability of the ML model to generalize on unseen data. In some examples, the size of the validation dataset can be denoted as $n_{val}$. The validation dataset can be divided into a set of bins R (e.g., R=$r_1$, . . . $r_s$) where s is the number of bins r in the set of bins R. The following variables are provided:

$B_j$: the set of validation points in the bin r of index j (r in [1, S])
acc($B_j$): the average accuracy of the validation points in $B_j$
con $f(B_m)$: the average confidence score of the ML model for the validation points in $B_j$ Perfect confidence calibration means that acc($B_j$)=con $f(B_j)$ for all j, where j is a counter (e.g., 1≤j≤s). In other words, the average confidence value in a given bin is equal to the average accuracy in that bin.

In production use of the ML model (e.g., use by an autonomous system to perform one or more tasks), if, for 100 data points the average confidence score given by the ML model is 0.75, then an average accuracy of 0.75 should be expected on this set of data. In this example, if the average accuracy is below 0.75, the ML model is considered over-confident. If the average accuracy is above 0.75, the ML model is considered under-confident.

A reliability diagram can be plotted as a two-dimensional (2D) graph, in which the points of coordinates (con $f(B_m)$, acc($B_m$)) are graphed. The reliability diagram of a perfectly calibrated model is equivalent to the function $f_{id}$:x->x (e.g., a straight diagonal line). If the ML model is over-confident, the curve is under $f_{id}$, and if the ML model is under-confident, the curve is above $f_{id}$.

In some implementations, a numerical metric can be used to provide additional objectivity in assessing over-/under-confidence of the ML model. For example, an expected calibration error (ECE) can be calculated. For a perfectly calibrated ML model, ECE is equal to 0. Consequently, a goal in calibrating confidence of an ML model is to minimize the ECE. ECE can be determined based on the following relationship:

$$ECE = \sum_{j=1}^{s} \frac{|B_j|}{n_{val}} |acc(B_j) - conf(B_j)|$$

Measuring the level of confidence reliability enables multiple confidence calibration approaches to be compared, as well as assessment of whether the confidence calibration approaches are needed at all.

Figure 3:
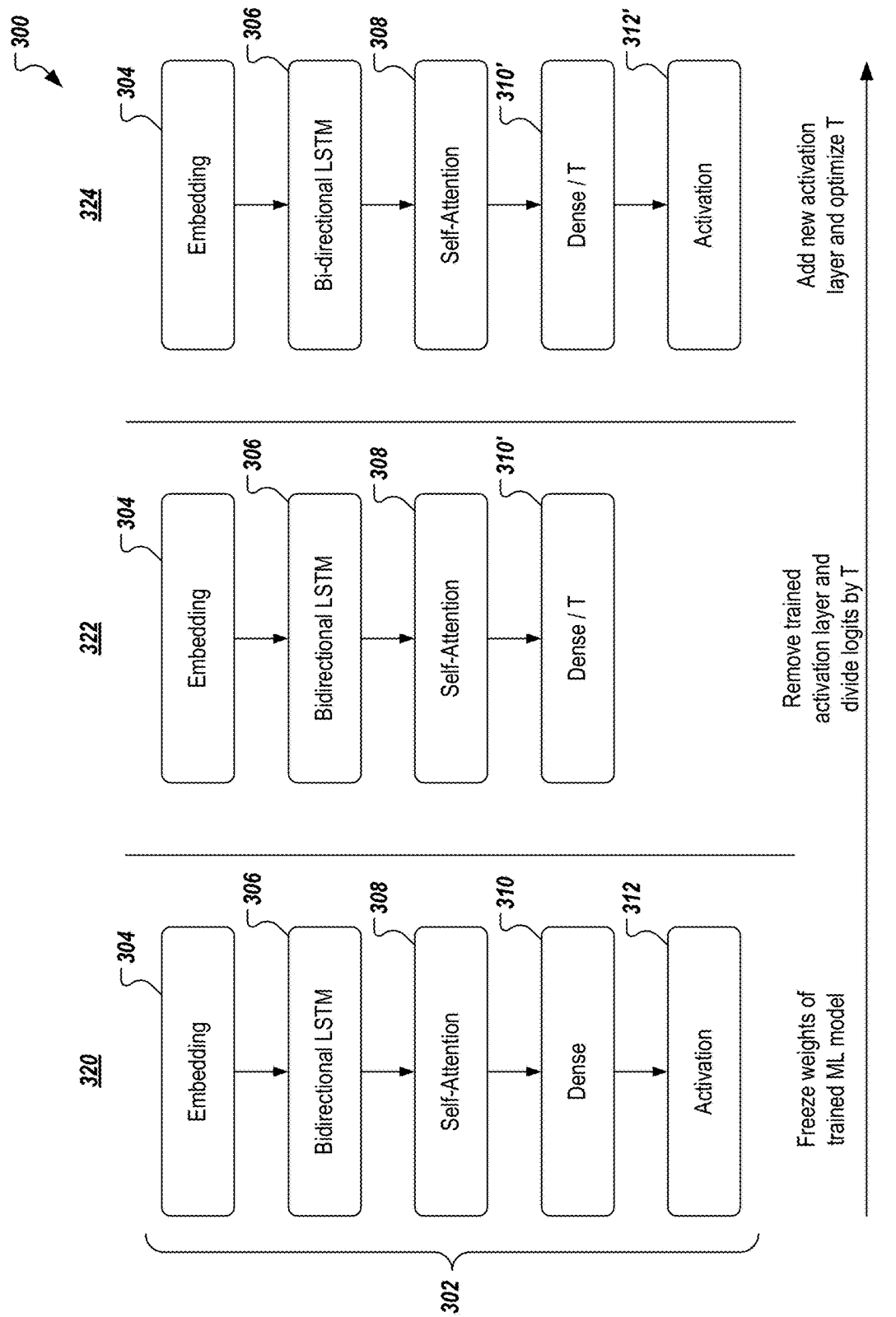
FIG. 3 depicts a flow for confidence calibration using temperature scaling.

In some implementations, confidence calibration can be optimized using temperature scaling. FIG. 3 depicts an example flow 300 for confidence calibration using temperature scaling. In temperature scaling, a ML model that has already been trained is retrieved (e.g., from computer-readable memory). In the non-limiting example of FIG. 3, a ML model 302 is provided as a neural network that includes an embedding layer 304, a bidirectional LSTM layer 306, a self-attention layer 308, a dense layer 310, and an activation layer 312, each of which is described herein.

In a first portion 320 of the flow 300, all of the trained weights (parameters) of the ML model 302 across all layers are frozen (fixed), such that the parameters cannot be changed. In a second portion 322 of the flow 300, the activation layer 312 of the ML model 302 is removed and the logits (weights) of the dense layer 310 are each divided by a temperature parameter T. In a third portion 324 of the flow 320, an activation layer 312' is added to the ML model 302. The activation layer 312' is different from the activation layer 312 originally provided with and removed from the ML model 302.

With the ML model 302 configured as provided in the third portion 300 (i.e., weights of the an embedding layer 304, a bidirectional LSTM layer 306, a self-attention layer 308 fixed, and weights of the dense layer 310 fixed, but divided by T), the ML model 302 is trained again using the validation data (the same validation data used to originally train the model 302). However, during training only the value of T is changed between training iterations to optimize the $F_{mod}$ loss function (described above). That is, during (re-) training of the ML model 302, values of the parameters across layers remain static, and only the value of T is iteratively changed in an effort to optimize the $F_{mod}$ loss function. In some examples, if the loss value does not meet an expected value (e.g., 0), the value of T is adjusted, and another iteration of training is performed. In some instances, this process is repeated until the loss value meets the expected value.

By optimizing the $F_{mod}$ loss function with T as the only variable parameter during (re-) training of the ML model 302, the $F_{mod}$ loss function is decrease further without effecting the accuracy of the ML model 302. In this manner, the ML model 302 provides better (e.g., more realistic, reliable, trustworthy) confidence scores with the same performance as provided prior to temperature scaling. More plainly stated, the loss on the validation set is reduced without altering the accuracy. Consequently, the confidence scores are more realistic for the exact same performance of the ML model 302 as achieved prior to temperature scaling.

Although other techniques, besides temperature scaling, are available for confidence calibration, such other techniques are typically complex in their implementation and/or require a significant amount of computational power. In a production environment, in which multiple customers (e.g., enterprises) can use the autonomous system at any time, there is an expectation (in some cases, a requirement) that any new feature be backward compatible. In view of this, the complexity and technical burden of such other techniques for confidence calibration are unwanted characteristics.

As introduced above, implementations of the present disclosure further enable reduction of risk in downstream tasks by providing a mapping between the confidence of the ML model to the expected accuracy of the ML model. As noted above, a downstream task can include a task that process an output of the ML model. In accordance with implementations of the present disclosure, after the ML model is trained and confidence calibration of the ML model has been performed, the accuracy of the ML model is evaluated using a holdout validation set. In some examples, the holdout validation set is a set of validation data (i.e., inputs with respective expected outputs) that were not used in either training of the ML model or confidence calibration of the ML model.

For a set of inputs $N_I$ (e.g., bank statements) in the holdout validation set, the ML model yields a set of outputs $N_O$ (e.g., probabilities that respective pairs of bank statements and customers match). In accordance with implementations of the present disclosure, a set of threshold values $\mathbb{T}$ is provided (e.g., $\mathbb{T} = \tau_1, \ldots, t_h$, where h is the number of threshold values $\tau$ in the set of threshold values $\mathbb{T}$). Each threshold value $\tau$ the set of threshold values $\mathbb{T}$ is a threshold confidence value. In some examples, each threshold value ($\tau$) can be described as a minimum confidence value that is required for a ML model to make a prediction. That is, the ML model makes a prediction with a confidence value that is less than the threshold value, the prediction is discarded (e.g., is not used in a downstream task). In some examples, $0 \leq \tau < 1$. For each threshold value $\tau$, a sub-set of inputs $N_{I,\tau}$ is determined from the set of inputs $N_I$. The inputs included in the sub-set of inputs $N_{I,\tau}$ are inputs, for which the ML model provided a prediction with confidence greater than the threshold value $\tau$. A sub-set of outputs $N_{O,\tau}$ is defined and includes the prediction output by the ML model for each of the inputs in the sub-set of inputs $N_{I,\tau}$.

In accordance with implementations of the present disclosure, an accuracy value ($\alpha$) of the ML model for a respective threshold value $\tau$ is calculated based on the sub-set of outputs $N_{O,\tau}$ and respective expected outputs provided from the holdout validation set. In some examples, each output in the sub-set of outputs $N_{O,\tau}$ is compared to a respective expected output provided from the holdout validation set. If the output and the expected output are the same, the ML model is determined to be accurate for the respective input. In some examples, a ratio of accurate outputs to total number of outputs in the sub-set of outputs $N_{O,\tau}$ is determined and is provided as the accuracy value $\alpha$ for the respective threshold value $\tau$. This process can be repeated for each threshold value $\tau$ in the set of threshold values $\mathbb{T}$ to provide the threshold-to-accuracy mapping. An example threshold-to-accuracy mapping for an example ML model is provided in Table 1, below.

TABLE 1

Example Threshold-to-Accuracy Mapping
Threshold-to-Accuracy Mapping

| Threshold ($\tau$) | Accuracy ($\alpha$) |
|---|---|
| 0.0 | 0.8 |
| 0.1 | 0.83 |
| 0.2 | 0.86 |
| ... | ... |
| 0.999 | 1.0 |

The threshold-to-accuracy mapping of the present disclosure enables the behavior of the underlying ML model to be configured within an autonomous system. For example, the autonomous system can include an accuracy configuration parameter that can be set to define an accuracy target ($\alpha_{target}$) from the ML model during production use of the ML model by the autonomous system. The tradeoff is that higher accuracy yields fewer proposals from the ML model, whereas lower accuracies yield more proposals from the ML model. Given the target accuracy $\alpha_{target}$, the threshold-to-accuracy mapping can be used to find the appropriate threshold value $\tau$ that satisfies this condition. Specifically, the smallest threshold value $\tau$ that yields the target accuracy $\alpha_{target}$ or higher is selected. For example, and using the threshold-to-accuracy mapping of Table 1 as a non-limiting example, if $\alpha_{target}$ is 0.85 (e.g., user input is provided to the autonomous system setting the accuracy configuration parameter to 0.85), the $\tau_{target}$=0.2 is selected. This target threshold value ($\tau_{target}$) is used to filter out any predictions of the ML model having a confidence that is lower than during an inference routine. For example, in production use, the ML model receives an input and provides an output (prediction) with a respective confidence value ($\tau_{predict}$). The confidence value is compared to $\tau_{target}$. If $\tau_{predict}$ is equal to or greater than $\tau_{target}$, the output is used for one or more downstream tasks. If $\tau_{predict}$ is less than $\tau_{target}$, the output is discarded (e.g., is not used for the one or more downstream tasks).

Provision and use of the threshold-to-accuracy mapping of the present disclosure enables fine-grained control of the behavior of the ML model. However, successful implementation depends on the reliability the ML model. That is, if the ML model is not confident about a particular output, the ML model should provide a lower probability, and vice-versa. Accordingly, use of the $F_{mod}$ loss function during training and post-training confidence calibration of the ML model prevent the ML model from becoming over-confident during the training procedure and encourage the ML model to produce more reliable outputs.

Figure 4:
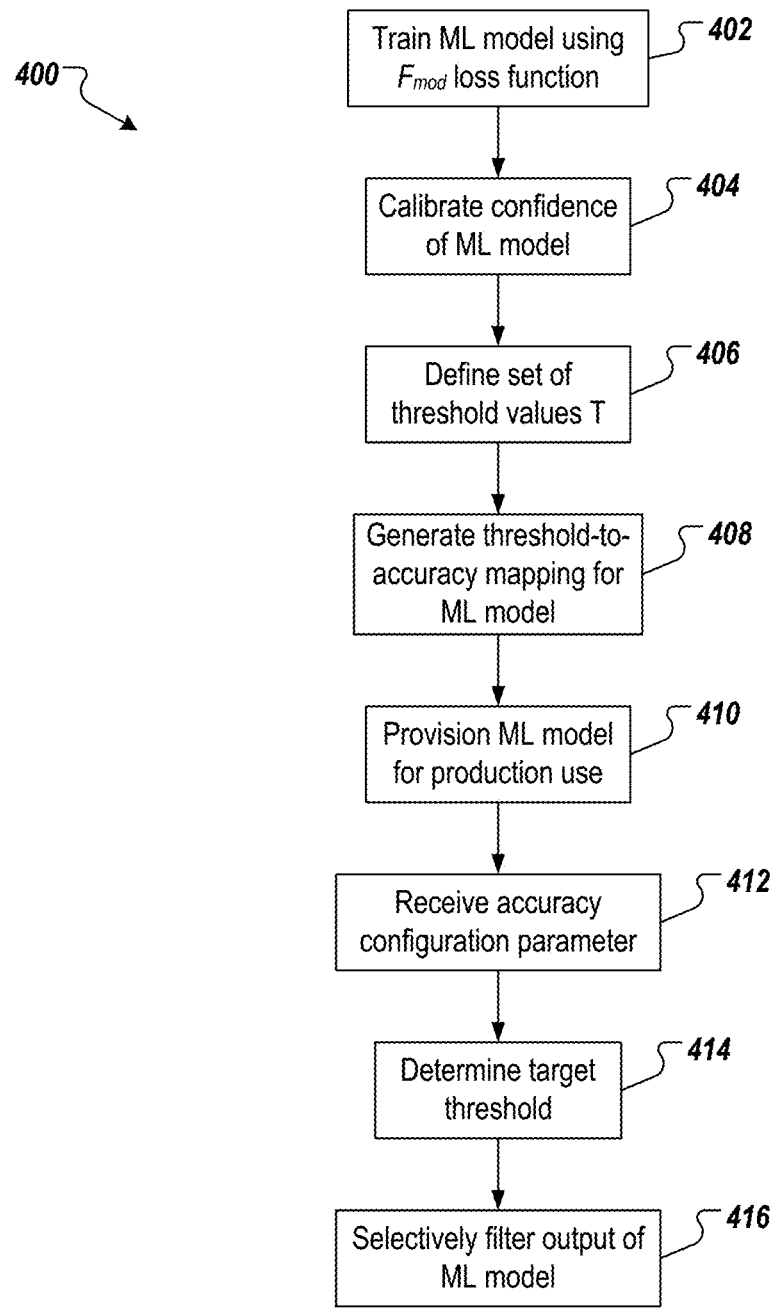
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A ML model is trained using the $F_{mod}$ loss function (402). For example, and as described herein, the ML model is iteratively trained, where, at each iteration, a loss value is determined based on the $F_{mod}$ loss function. The loss value represents a degree of accuracy of the output of the ML model at each iteration. If the loss value does not meet an expected value (e.g., 0), parameters of the ML model are adjusted, and another iteration of training is performed. In some instances, this process is repeated until the loss value meets the expected value.

A confidence of the ML model is calibrated (404). For example, after the ML model is trained, a confidence of the ML model is calibrated using temperature scaling. During temperature scaling all of the trained weights (parameters) of the ML model across all layers are frozen (fixed), the activation layer of the ML model is removed and the logits (weights) of the dense layer are each divided by a temperature parameter T, an activation layer (new activation layer) is added to the ML model, and the ML model is again trained by only the value of T is between training iterations, as described in further detail herein with reference to FIG. 3.

A set of threshold values $\mathbb{T}$ is defined (406). For example, and as described herein, a set of threshold values $\mathbb{T}$ is provided (e.g., $\mathbb{T}=\tau_1, \ldots, \tau_h$, where h is the number of threshold values $\tau$ in the set of threshold values $\mathbb{T}$). Each threshold value $\tau$ the set of threshold values $\mathbb{T}$ is a threshold confidence value. A threshold-to-accuracy mapping is generated for the ML model (408). For example, and as described herein, an accuracy value ($\alpha$) of the ML model for a respective threshold value $\tau$ is calculated based on the sub-set of outputs $N_{O,\tau}$ and respective expected outputs provided from the holdout validation set. In some examples, each output in the sub-set of outputs $N_{O,\tau}$ is compared to a respective expected output provided from the holdout validation set. If the output and the expected output are the same, the ML model is determined to be accurate for the respective input. In some examples, a ratio of accurate outputs to total number of outputs in the sub-set of outputs $N_{O,\tau}$ is determined and is provided as the accuracy value $\alpha$ for the respective threshold value $\tau$. This process can be repeated for each threshold value $\tau$ in the set of threshold values $\mathbb{T}$ to provide the threshold-to-accuracy mapping.

Provision ML model for production use (410). For example, and as described herein, the ML model can be incorporated into, or otherwise be accessed by one or more applications (e.g., autonomous systems) used by an enterprise and/or customers of the enterprise. In some examples, during production use, the ML model provides one or more outputs that are used in one or more downstream tasks. An accuracy configuration parameter is received (412). For example, and as described herein, input can be received, which input represents a selection of an accuracy value for the accuracy configuration parameters. A target threshold value is determined (414). For example, and as described herein, the accuracy value is used as an index to the threshold-to-accuracy mapping, to determine the target threshold value.

Output of the ML model is selectively filtered based on the target threshold value (416). For example, and as described herein, each output of the ML model is provided with a respective confidence value by the ML model, and, if the confidence value does not meet the target threshold value selected for the ML model, the output is ignored (i.e., is not used by any downstream task). If the confidence value meets the target threshold value selected for the ML model, the output is used by the autonomous system in one or more downstream tasks.

Figure 5:
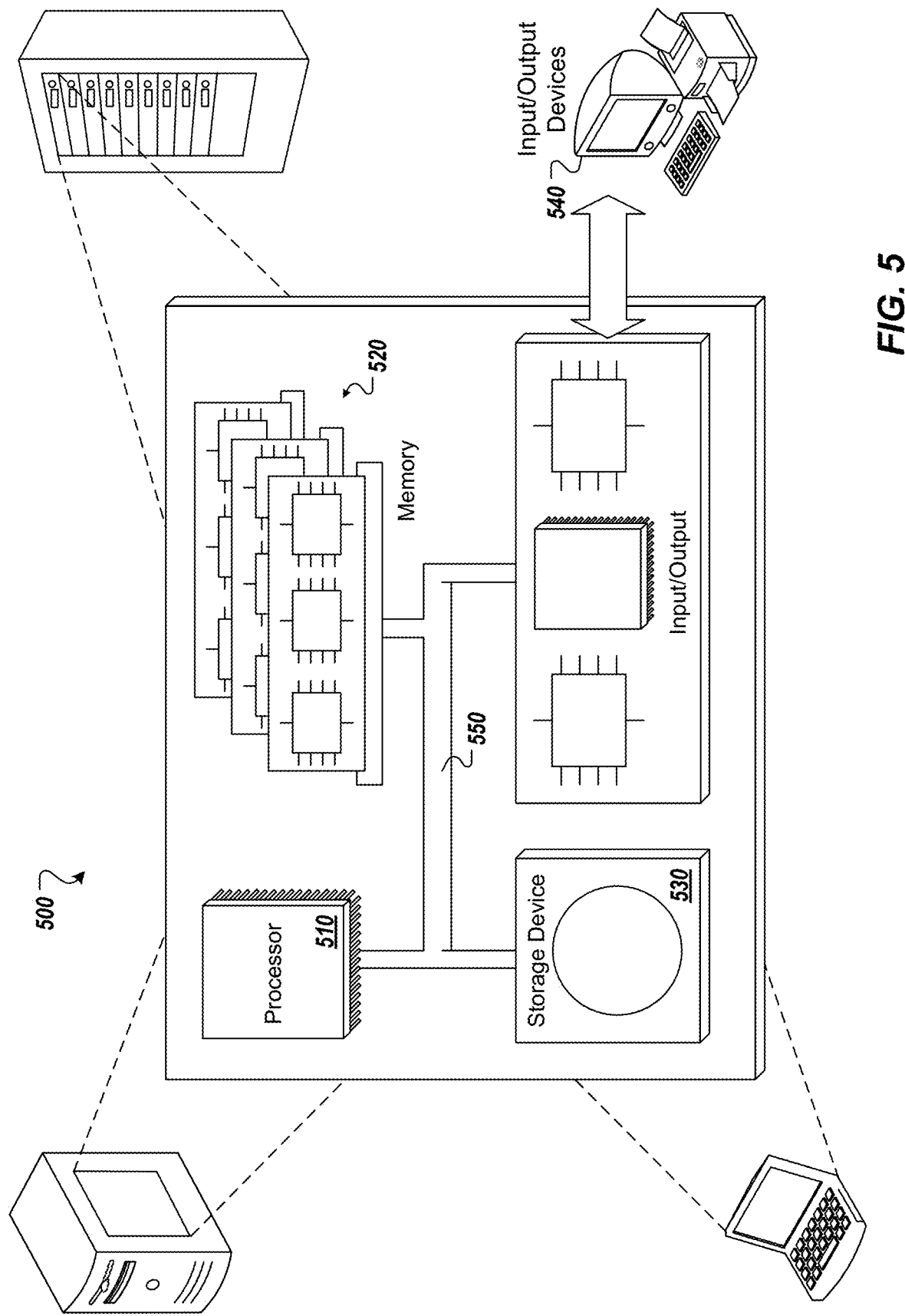
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for tuning behavior of a machine learning (ML) model, the method being executed by one or more processors and comprising:
   training the ML model using a modified focal loss function, the modified focal loss function comprising an exponential variable having a value that is determined based on a class of training data provided as input to the ML model during a training iteration;
   after training of the ML model, calibrating a confidence of the ML model by processing the ML model using temperature scaling comprising fixing parameters of layers of the ML model and re-training of the ML model to optimize the modified focal loss function by adjusting a temperature value during iterations of training;
   after calibrating the confidence of the ML model, generating a threshold-to-accuracy mapping for the ML model, the threshold-to-accuracy mapping associating a set of threshold values to a set of accuracy values;
   receiving a selected accuracy value;
   determining a threshold value from the threshold-to-accuracy mapping based on the selected accuracy value; and
   during production use of the ML model selectively discarding predictions of the ML model based on the threshold value.

2. The method of claim 1, wherein the modified focal loss function is provided as:

$$F_{mod} = -\sum_{i}^{m} t_i(1-p_i)^{\gamma_i}\log(p_i)$$

where i is a counter (1≤i≤m), m is a number of classes c in a set of classes C, $t_i$ is an indicator variable for each class c in the set of classes C, $p_i$ is the probability of an input to the ML model being classified as class $c_i$ during training, and $\gamma_i$ is the exponential variable having a value that is determined based on the class $c_i$.

3. The method of claim 2, wherein the value of the exponential value is determined based on a frequency of a respective class within the training data.

4. The method of claim 1, wherein temperature scaling further comprises replacing at least one layer of the ML model prior to re-training of the ML model.

5. The method of claim 1, wherein one or more parameters of at least one layer of the ML model are each divided by the temperature value.

6. The method of claim 1, wherein the threshold-to-accuracy mapping is generated using holdout validation set, the holdout validation set comprising data that is not used in either training of the ML model or confidence calibration of the ML model.

7. The method of claim 1, wherein the ML model comprises a multi-layer neural network.

8. A non-transitory computer-readable storage medium coupled to one or more processors and having instructions stored thereon which, when executed by the one or more processors, cause the one or more processors to perform operations for tuning behavior of a machine learning (ML) model, the operations comprising:
training the ML model using a modified focal loss function, the modified focal loss function comprising an exponential variable having a value that is determined based on a class of training data provided as input to the ML model during a training iteration;
after training of the ML model, calibrating a confidence of the ML model by processing the ML model using temperature scaling comprising fixing parameters of layers of the ML model and re-training of the ML model to optimize the modified focal loss function by adjusting a temperature value during iterations of training;
after calibrating the confidence of the ML model, generating a threshold-to-accuracy mapping for the ML model, the threshold-to-accuracy mapping associating a set of threshold values to a set of accuracy values;
receiving a selected accuracy value;
determining a threshold value from the threshold-to-accuracy mapping based on the selected accuracy value; and
during production use of the ML model selectively discarding predictions of the ML model based on the threshold value.

9. The computer-readable storage medium of claim 8, wherein the modified focal loss function is provided as:

$$F_{mod} = -\sum_{i}^{m} t_i(1-p_i)^{\gamma_i}\log(p_i)$$

where i is a counter (1≤i≤m), m is a number of classes c in a set of classes C, $t_i$ is an indicator variable for each class c in the set of classes C, $p_i$ is the probability of an input to the ML model being classified as class $c_i$ during training, and $\gamma_i$ is the exponential variable having a value that is determined based on the class $c_i$.

10. The computer-readable storage medium of claim 9, wherein the value of the exponential value is determined based on a frequency of a respective class within the training data.

11. The computer-readable storage medium of claim 8, wherein temperature scaling further comprises replacing at least one layer of the ML model prior to re-training of the ML model.

12. The computer-readable storage medium of claim 8, wherein one or more parameters of at least one layer of the ML model are each divided by the temperature value.

13. The computer-readable storage medium of claim 8, wherein the threshold-to-accuracy mapping is generated using holdout validation set, the holdout validation set comprising data that is not used in either training of the ML model or confidence calibration of the ML model.

14. The computer-readable storage medium of claim 8, wherein the ML model comprises a multi-layer neural network.

15. A system, comprising:
a computing device; and
a computer-readable storage device coupled to the computing device and having instructions stored thereon which, when executed by the computing device, cause the computing device to perform operations for tuning behavior of a machine learning (ML) model, the operations comprising:
training the ML model using a modified focal loss function, the modified focal loss function comprising an exponential variable having a value that is determined based on a class of training data provided as input to the ML model during a training iteration;
after training of the ML model, calibrating a confidence of the ML model by processing the ML model using temperature scaling comprising fixing parameters of layers of the ML model and re-training of the ML model to optimize the modified focal loss function by adjusting a temperature value during iterations of training;
after calibrating the confidence of the ML model, generating a threshold-to-accuracy mapping for the ML model, the threshold-to-accuracy mapping associating a set of threshold values to a set of accuracy values;
receiving a selected accuracy value;
determining a threshold value from the threshold-to-accuracy mapping based on the selected accuracy value; and
during production use of the ML model selectively discarding predictions of the ML model based on the threshold value.

16. The system of claim 15, wherein the modified focal loss function is provided as:

$$F_{mod} = -\sum_{i}^{m} t_i(1-p_i)^{\gamma_i}\log(p_i)$$

where i is a counter (1≤i≤m), m is a number of classes c in a set of classes C, $t_i$ is an indicator variable for each class c in the set of classes C, $p_i$ is the probability of an input to the ML model being classified as class $c_i$ during training, and $\gamma_i$ is the exponential variable having a value that is determined based on the class $c_i$.

17. The system of claim 16, wherein the value of the exponential value is determined based on a frequency of a respective class within the training data.

18. The system of claim 15, wherein temperature scaling further comprises replacing at least one layer of the ML model prior to re-training of the ML model.

19. The system of claim 15, wherein one or more parameters of at least one layer of the ML model are each divided by the temperature value.

20. The system of claim 15, wherein the threshold-to-accuracy mapping is generated using holdout validation set, the holdout validation set comprising data that is not used in either training of the ML model or confidence calibration of the ML model.

* * * * *